United States Patent
Krickau et al.

(10) Patent No.: US 6,776,401 B2
(45) Date of Patent: Aug. 17, 2004

(54) HELICAL COMPRESSION SPRING FOR USE IN A COMPONENT OF A FUEL INJECTION SYSTEM

(75) Inventors: Otto Krickau, Stuttgart (DE); Gerhard Auweder, Vaihingen (DE); Ralf Pfrommer, Schoemberg (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 09/979,731
(22) PCT Filed: May 29, 2001
(86) PCT No.: PCT/DE01/01270
 § 371 (c)(1),
 (2), (4) Date: Apr. 15, 2002
(87) PCT Pub. No.: WO01/75325
 PCT Pub. Date: Oct. 11, 2001

(65) Prior Publication Data
 US 2003/0098537 A1 May 29, 2003

(30) Foreign Application Priority Data
 Apr. 1, 2000 (DE) .......................... 100 16 425

(51) Int. Cl.$^7$ ................................. F16F 1/06
(52) U.S. Cl. ................... 267/167; 239/533.9
(58) Field of Search .............. 267/167, 180, 267/182; 239/533.1, 533.2, 533.9, 533.8, 88, 92, 96, 124, 127

(56) References Cited

U.S. PATENT DOCUMENTS 2,157,820 A * 5/1939 Fleck ................. 267/166
2,998,242 A * 8/1961 Schwarzbeck et al. ...... 267/204
5,871,155 A * 2/1999 Stockner et al. .............. 239/92
5,934,572 A * 8/1999 Hofmann et al. ......... 239/533.9

FOREIGN PATENT DOCUMENTS

| DE | 3701016 A1 | * | 7/1988 |
| DE | 4306895 C1 | * | 4/1994 |
| FR | 0596810 A1 | * | 5/1994 |
| GB | 2308409 A | * | 6/1997 |

* cited by examiner

Primary Examiner—Pam Rodriguez
(74) Attorney, Agent, or Firm—Ronald E. Greigg

(57) ABSTRACT

A helical compression spring for use in a component of a fuel injection system, for example a component in the form of a fuel injection valve, which helical compression spring has a spring wire cross section that corresponds to a rectangle in which the corners are rounded and the inner surface, which constitutes the inside of the helical compression spring, is curved in a sharply convex fashion. This cross sectional contour of the spring wire reduces the shearing stresses when the helical compression spring is loaded, as a result of which the helical compression spring can be embodied as shorter while retaining the same spring constant. The side surfaces of the spring wire, which are oriented toward each other in the helical compression spring, are embodied as at least approximately parallel to each other so that they rest against one another in a flat fashion at the ends of the helical compression spring due to the winding height that is reduced there. This prevents a decrease in the spring force in a prestressed helical compression spring.

20 Claims, 3 Drawing Sheets

HELICAL COMPRESSION SPRING FOR USE IN A COMPONENT OF A FUEL INJECTION SYSTEM

CROSS-REFERENCE TO RELATED APPLICATIONS

This application is a 35 U.S.C. 371 application of PCT/DE 01/01270, filed on Mar, 29, 2001.

BACKGROUND OF THE INVENTION

The invention is based on a helical compression spring for use in a fuel injection system.

DESCRIPTION OF THE PRIOR ART

DE 195 47 424 A1 has disclosed a helical compression spring in which wire with a circular cross section is wound to produce a helical compression spring, which is then flattened at its ends. The helical compression spring is disposed in a component of a fuel injection system and acts on a control part, for example a valve member in a fuel injection valve. A valve member of this kind has a pressure face, which is acted on by the highly pressurized fuel, and by means of the hydraulic force thus produced, can be moved counter to the force of the helical compression spring, as a result of which the valve member controls the injection of fuel into the combustion chamber of an internal combustion engine. Since the fuel pressure in fuel injection valves of the kind used to inject fuel into the combustion chamber of an auto-ignition engine is very high-up to 200 MPa, powerful forces act on the valve member so that the helical compression spring must exert a correspondingly powerful opposing force. On the other hand, since the fuel injection valve, like all other components of the fuel injection system, should be compact in design, a helical compression spring is needed, which has a low winding ratio.

The round wire used previously has the disadvantage that the shearing strains in the inner region of the spring wire of the helical compression spring become relatively intense when loaded with pressure, which makes it impossible to reduce the diameter of the helical compression spring beyond a certain value. DE 195 47 102 A1 has disclosed a helical compression spring that is in fact produced from a round wire, but after being wound, the helical compression spring is ground somewhat on the outside. This achieves virtually the same spring constant with a smaller diameter, since the outer region of the helical compression spring is not subject to any intense stresses and consequently makes hardly any contribution to the total rigidity of the helical compression spring, but there is still the disadvantage that the stresses on the inside of the helical compression spring remain great. Moreover, like all round wire springs, this one has the disadvantage that the initial stress of the helical compression spring decreases with time and the opening pressure of the valve member decreases along with it. This occurs due to the fact that a flat contact surface has to be provided, which is aligned perpendicular to the longitudinal axis of the helical compression spring. The last two loops of the helical compression spring contact each other over a part of their length so that the spring wire of the penultimate loop has a linear contact with the spring wire of the last loop. This pressure produces locally intense mechanical stresses, which in connection with relative movements, can produce vibrational wear on the helical compression spring at this location. This leads to a flattening of the spring wire there until a flat contact of the relevant spring loops is produced. As a result, the helical compression spring shortens somewhat and the opening pressure of the fuel injection valve decreases due to the decreasing initial stress of the helical compression spring.

The prior art has also disclosed helical compression springs that have a rectangular spring wire cross section, for example in DE 37 01 016 A. A helical compression spring of this kind does in fact solve the problem of the high pressure and the resulting decrease in opening pressure of fuel injection valves, but the mechanical stress distribution on the internal diameter of the spring is unfavorable. In order to avoid powerful stresses, attention must also be paid here that the winding ratio is not selected as too low.

SUMMARY OF THE INVENTION

The helical compression spring according to the invention has the advantage over the prior art that due to the optimized spring wire cross section, a compressive initial stress of the helical compression spring is not reduced or is only reduced to an insignificant degree by wear between the wire ends and the respective loops adjoining them and that with the same external dimensions, the helical compression spring produces greater spring forces than a helical compression spring with a circular spring wire cross section. The sides of the spring wire, which are oriented toward each other, are surfaces that are embodied as at least approximately parallel to each other so that at the ends of the helical compression spring, between the wire ends and the adjacent loops of the spring wire, a flat contact is achieved, which reduces wear and therefore sharply reduces a decrease in the opening pressure of the fuel injection valve.

In one advantageous embodiment, the spring wire of the helical compression spring has a cross section, which starts out square and is then rounded, and whose side constituting the inside of the helical compression spring is convexly curved. When the helical compression spring is compressed and also as a result of the initial stress, chiefly shearing stresses occur in the helical compression spring, which reach their maximal intensity on the inside of the helical compression spring. Due to the powerful forces to which the helical compression spring is subjected, for example in a fuel injection valve, powerful shearing stresses occur in the spring wire, which must not exceed certain maximal values. As a result, with a predetermined opening pressure and opening stroke of the valve member of a fuel injection valve, the helical compression spring cannot exceed a certain length. Because of the changed cross section, the helical compression spring according to the invention reduces the maximal shearing stress so that greater spring forces can be achieved with the same length. Alternatively, this circumstance can also be used to produce a shorter helical compression spring without changing the spring forces or the spring constant so that the fuel injection valve can be designed to be correspondingly shorter.

In order to obtain a spring with the cross section according to the invention, a wire must be used, which has a cross section that differs from it, since the cross section of the spring wire changes when being wound into the helical compression spring. With the spring wire according to the invention, the side surfaces that are oriented toward each other after the winding of the helical compression spring are embodied as inclined in relation to each other. This inclination of the side surfaces advantageously results in the fact that the side surfaces are aligned at least approximately parallel to each other when the helical compression spring is wound and then have the above-described advantages without requiring an expensive, complex secondary processing of the helical compression spring after winding.

The helical compression spring according to the invention can also be provided for use in another component of a fuel injection system. For example, there are also control parts in high-pressure fuel pumps, which are hydraulically moved by the fuel pressure counter to the force of a helical compression spring. Since it is important here—as in all components of the fuel injection system—to use the most compact, space-saving design possible, advantageous use can be made here of the helical compression spring according to the invention.

Other advantages and advantageous embodiments of the subject of the invention can be inferred from the drawings, the specification, and the claims.

BRIEF DESCRIPTION OF THE DRAWINGS

An exemplary embodiment of a helical compression spring according to the invention will be described herein below, in conjunction with the drawings, in which.

DESCRIPTION OF THE PREFERRED EMBODIMENTS

Figure 1:
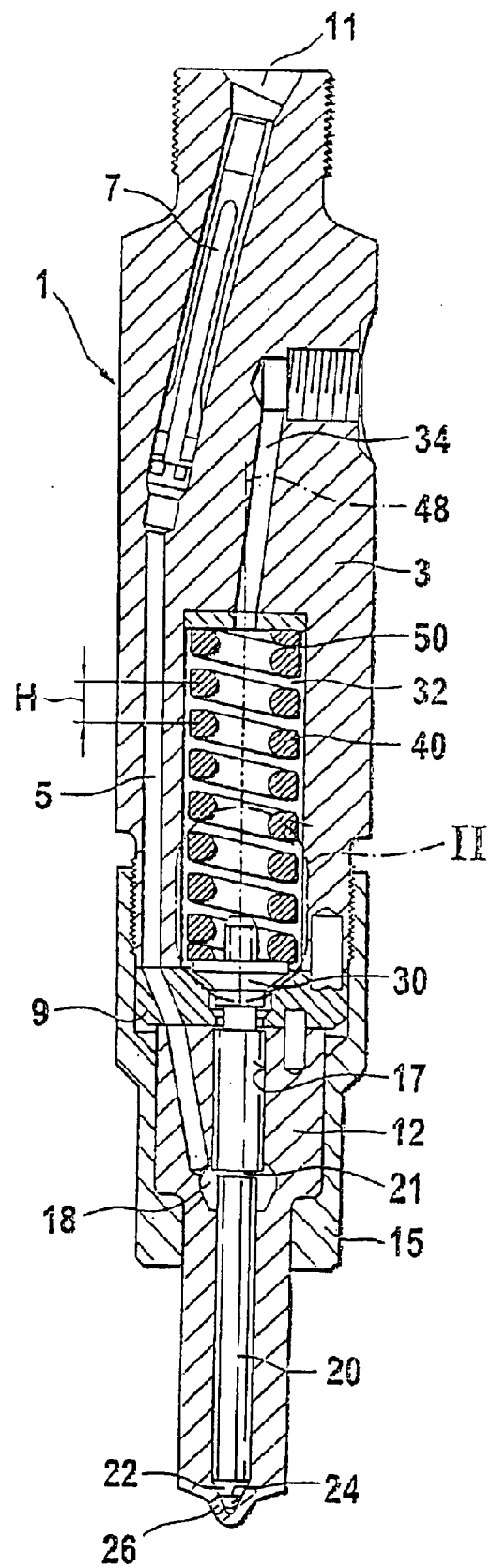
FIG. 1 shows a longitudinal section through a fuel injection valve with a helical compression spring according to the invention.

FIG. 1 shows a longitudinal section through a fuel injection valve 1 of the kind used to inject fuel directly into the combustion chamber of an internal combustion engine, preferably of an auto-ignition engine. A valve holding body 3 is axially braced against a valve body 12, with the interposition of a intermediary disk 9, by means of an adjusting nut 15. A bore 17 is provided in the valve body 12 and a valve seat 24 is embodied at the end of this bore oriented toward the combustion chamber. At least one injection opening 26 is embodied in the valve seat 24 and connects the bore 17 to the combustion chamber. The bore 17 contains a valve member 20, which tapers toward the combustion chamber to form a pressure shoulder 21 and at the end oriented toward the combustion chamber, transitions into a valve sealing surface 22, which cooperates with the valve seat 24 and thus controls the connection of the injection opening 26 to the bore 17.

In the vicinity of the pressure shoulder 21, a pressure chamber 18 is produced by means of a radial widening of the bore 17, and continues toward the valve seat 24 in the form of an annular conduit encompassing the valve member 20. The pressure chamber 18 is connected to a high-pressure connection 11 by means of an inlet conduit 5, which extends in the valve body 12 between the intermediary disk 9 and the valve holding body 3. By means of a high-pressure fuel source that is not shown in the drawing, the high-pressure connection 11 can be supplied with highly pressurized fuel so that the fuel flows via the inlet conduit 5 into the pressure chamber 18. A fuel filter 7 can be provided in the inlet conduit 5, which filters out suspended matter and dirt particles from the fuel and thus assures the proper function of the fuel injection valve 1.

At the end remote from the combustion chamber, the valve member 20 transitions into a spring plate 30, which is disposed in the intermediary disk 9 and protrudes into a spring chamber 32 embodied in the valve holding body 3. The spring chamber 32 contains a helical compression spring 40, which is disposed with initial stress between the spring plate 30 and the end of the spring chamber 32 remote from the valve member 20. The spring chamber 32 in this-instance is connected to a fuel drainage system, not shown in the drawing, by means of an outlet conduit 34. As a result of the force of the initial stress, the helical compression spring 40 presses the valve plate 30 toward the combustion chamber and therefore also presses the valve member 20 with the valve sealing surface 22 against the valve seat 24. This closes the injection opening 26 and no fuel can travel from the pressure chamber 18 to the injection opening 26 and from there into the combustion chamber.

The fuel injection valve functions as follows: highly pressurized fuel is fed from the high-pressure fuel source, not shown in the drawing, via the high-pressure connection 11, and into the inlet conduit 5, and therefore also into the pressure chamber 18. The increasing fuel pressure produces a hydraulic force against the pressure shoulder 21 of the valve member 20, which hydraulic force is directed to counter to the force of the helical compression spring 40. Since the helical compression spring 40 is disposed in the spring chamber 32 under initial stress, a particular opening force is required in order for the hydraulic force on the pressure shoulder 21 to be greater than the force of the helical compression spring 40. If this opening pressure in the pressure chamber 18 is achieved, then the valve member 20 moves away from the combustion chamber until it comes into contact with a stop surface embodied on the intermediary disk 9. As a result, the valve sealing surface 22 lifts up from the valve seat 24 and the injection opening 26 is connected to the pressure chamber 18 so that fuel is injected into the combustion chamber of the engine. The end of the injection is produced by virtue of no more fuel being fed from the high-pressure system into the inlet conduit 5; as a result, the fuel pressure in the pressure chamber 18 decreases until the hydraulic force on the pressure shoulder 21 falls below the force of the helical compression spring 40. The valve member 20 is then moved back toward the combustion chamber by the force of the helical compression spring 40 until the valve sealing surface 22 comes into contact with the valve seat 24 and closes the injection opening 26.

Figure 2:
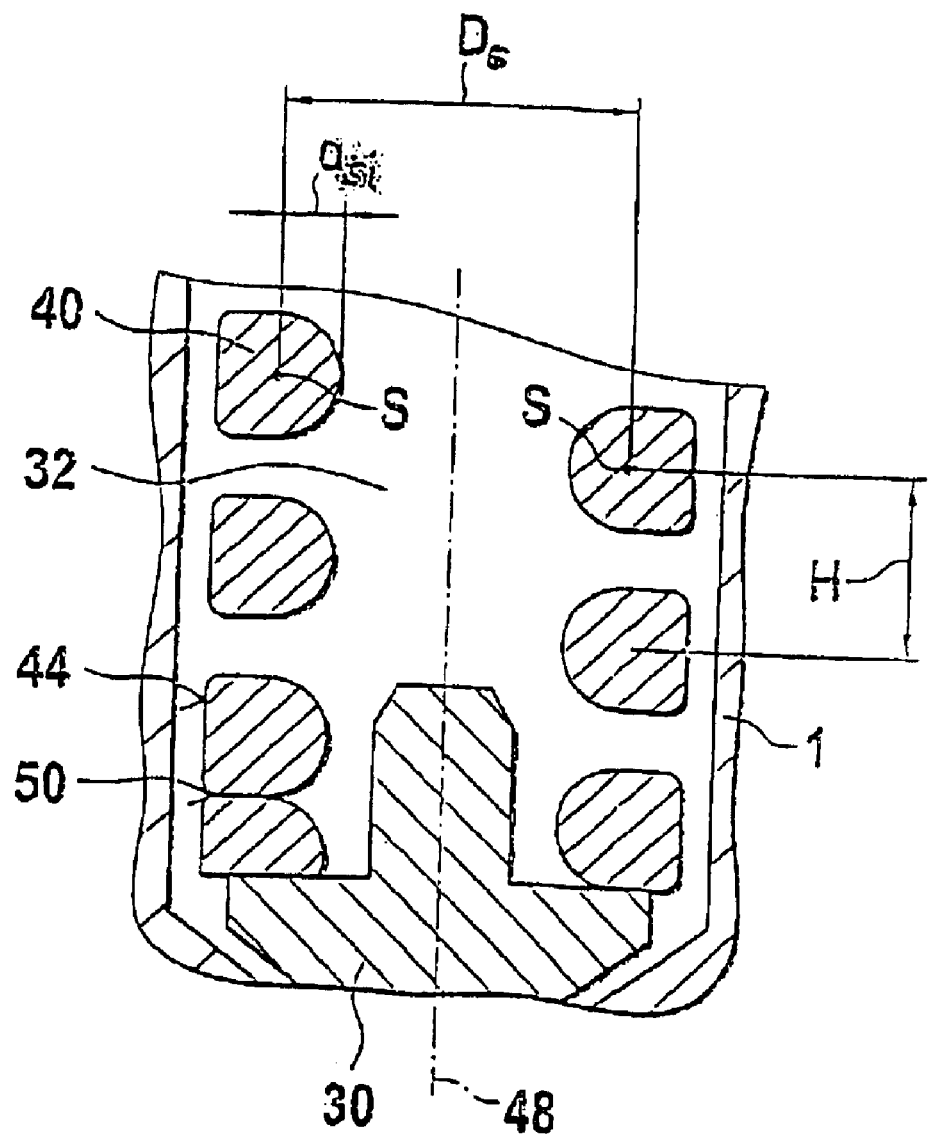
FIG. 2 shows an enlargement of a portion of the fuel injection valve shown in FIG. 1, in the vicinity of the spring chamber close to the valve member.
Figure 3:
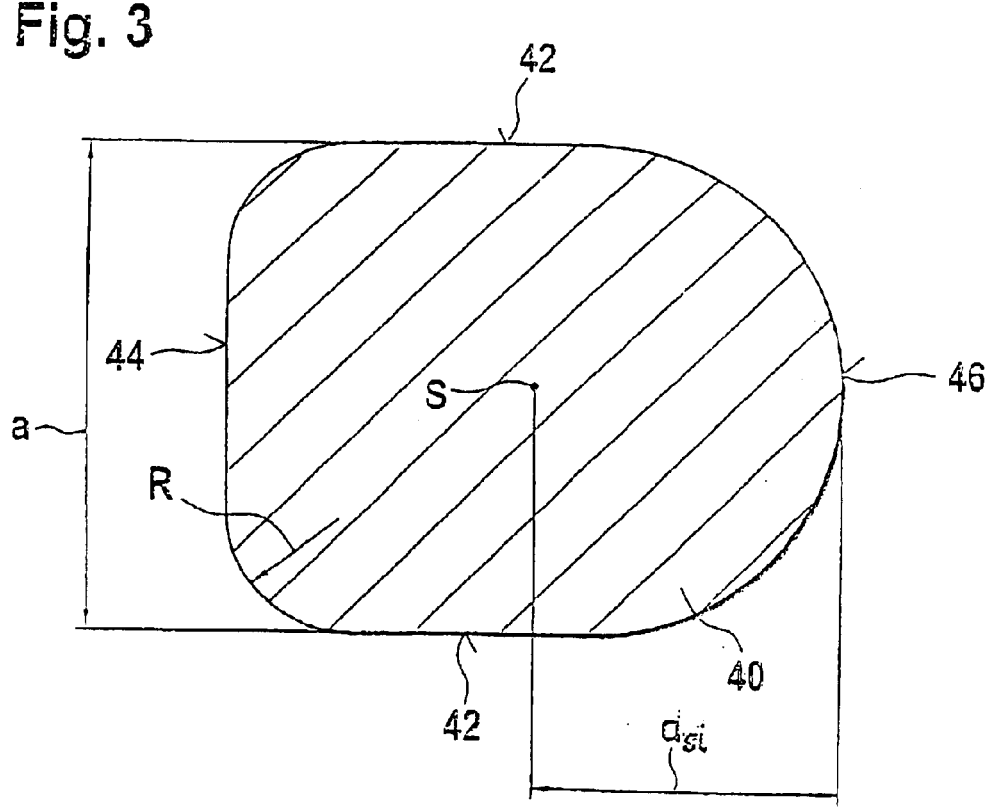
FIG. 3 shows a cross section through the spring wire of the helical compression spring.

FIG. 2 shows an enlargement of a portion of the fuel injection valve shown in FIG. 1, in the vicinity of the spring chamber 32 close to the valve member, and FIG. 3 shows an enlarged cross section through the spring wire of the helical compression spring 40.

The helical compression spring 40 is characterized, among other things, by means of the average winding diameter $D_s$. With a circular wire cross section, the winding diameter $D_s$ is defined by the diameter of the helix formed by the center points of the circles. This definition is not possible with the current cross sectional form of the spring wire so that instead of the center point of the circles, the area centroid S of the spring wire cross section is used.

Another characteristic value is the winding ratio $w_s$ of the helical compression spring 40. With a circular cross section of the spring wire, this winding ratio is defined by the quotient of the winding diameter $D_s$ and the spring wire diameter. With the current spring wire cross section, this definition must also be modified so that the winding ratio $w_s$ here is defined by the quotient of half the winding diameter $D_s/2$ and the center-of-gravity distance $a_{si}$ of the area centroid S from the inner surface 46 of the helical compression spring 40:

$$w_s = \frac{D_s/2}{a_{si}}$$

The smaller the winding diameter $D_s$ and the greater the center-of-gravity distance $a_{si}$ are, the lower the winding ratio $w_s$ and the greater the spring constant K of the helical compression spring 40 is. The spring constant K characterizes the rigidity of the helical compression spring 40 and is defined by the ratio of the force F acting on the end of the helical compression spring 40, parallel to the longitudinal axis 48, and the associated length change Δl of the helical compression spring 40:

$$K = \frac{F}{\Delta l}$$

With a purely elastic deformation and with small length changes Δl, the spring constant K is independent of the force F being exerted ("Hooke's Law") and with a given geometry of the helical compression spring 40, depends only on the material of the spring wire used. Since a fuel injection valve 1 of the kind described further above injects at a very high fuel pressure due to the combustion conditions to be optimized in the internal combustion engine, pressures of up to 200 MPa occur in the fuel injection valve 1. In order to achieve a high opening pressure of the fuel injection valve, the helical compression spring 40 must therefore exert a very powerful spring force F in order to be able to resist the powerful hydraulic forces. Depending on the diameter of the valve member, therefore, spring constants of approximately 100 to 300 N/mm are required. In order to achieve this, the helical compression springs must have a very low winding ratio $w_s$, in the range from 2 to 3. The distance from the inside to the outside of the spring wire is approximately 2 to 7 mm. Due to the high spring constants K, metal, preferably spring steel, is used as the material for the helical compression spring 40. With considerably lower forces on the helical compression spring 40 and correspondingly lower spring constants K, it is also possible to manufacture the helical compression spring 40 not out of metal, but out of a plastic, for example.

The helical compression spring 40 has a winding height H, which is defined as the distance, measured in the direction of the longitudinal axis 48 of the helical compression spring 40, between the area centroid S of two successive loops of the spring wire. The winding height H is at least approximately constant in the middle region of the helical compression spring 40. In order to achieve a flat contact surface at the end face of the helical compression spring 40, the winding height H is reduced toward the end of the helical compression spring 40 until the spring wire rests against the spring wire of the preceding loop. Starting from this spring contact point 50, there is approximately one additional full loop of the spring wire. This loop is then ground to produce a contact surface perpendicular to the longitudinal axis 48 of the helical compression spring 40.

Because the side surface 42 of the last loop of the spring wire contacts the side surface 42 of the preceding loop, powerful mechanical stresses are produced in this region when the helical compression spring 40 is compressed. But the flat, parallel side surfaces 42 produce a moderate surface pressure so that wear on the helical compression spring 40 is prevented. The wear could lead to a disadvantageous decrease in the initial stress and therefore to an impermissible decrease in the opening pressure of the fuel injection valve.

The spring wire of the helical compression spring 40 has a cross section which corresponds to a rectangle with rounded corners, whose inner surface 46 that constitutes the inside of the helical compression spring 40 is curved in a convex fashion. In this instance, the outer surface 44 of the helical compression spring 40 is embodied as flattened so that the helical compression spring 40 has a smaller outer diameter than would be the case with a spring having the same spring constant K and a circular spring wire cross section. As a result, the helical compression spring 40 requires less space in the valve holding body 1, so that the fuel injection valve as a whole can be embodied as somewhat narrower.

The sharp curvature of the inside 46 increases the distance from the inside 46 to the area centroid S of the wire. As a result, the stresses in the vicinity of the inside 46 of the helical compression spring 40 can be advantageously reduced, which with the same spring constant K, permits the helical compression spring 40 to be shorter in length than a helical compression spring with a circular spring wire cross section.

The rounding radius R at the transition of the side surface 42 to the outer surface 44 of the spring wire, as shown in FIG. 3, is approximately 20 to 40% of the distance a between the two side surfaces 42. As a result, in contrast to a sharp-edged transition between the side surface 42 and the outer surface 44, a stress overload at this point can be prevented without the spring constant K decreasing noticeably as a result.

Figure 4:
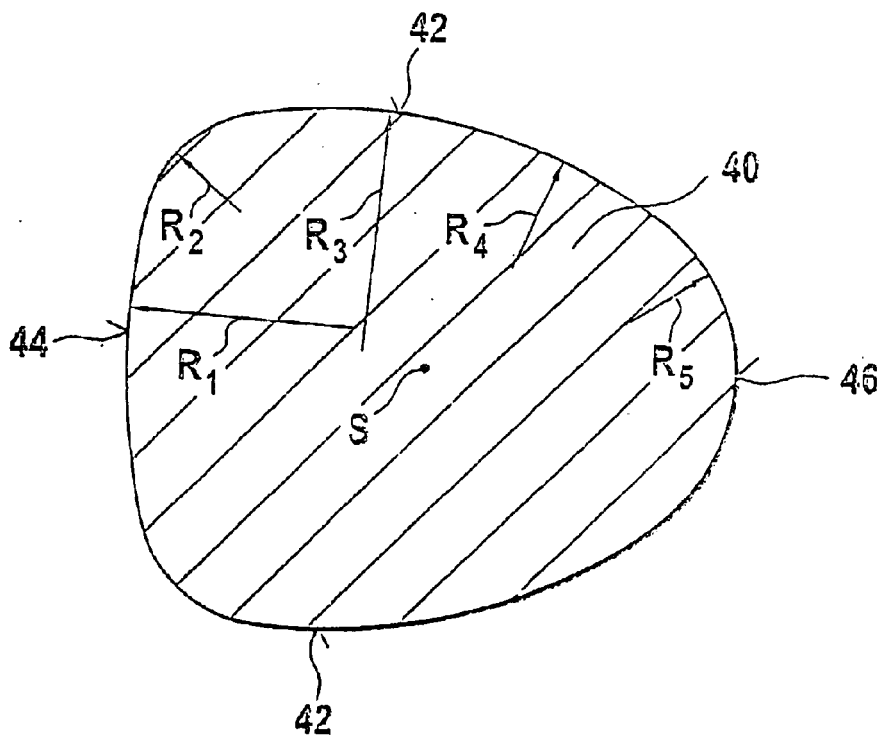
FIG. 4 shows a cross section through the spring wire before the helical compression spring is wound.

In order to be able to produce a helical compression spring 40 according to the invention, a spring wire with a particular cross sectional contour must be wound in accordance with the demands placed on the helical compression spring 40. FIG. 4 shows the cross section of a corresponding spring wire. The area cross section of the spring wire differs from the area cross section of the completely wound helical compression spring 40 shown in FIG. 3 because the spring wire is deformed significantly during the winding process due to the low winding ratio $w_s$. The side surfaces 42 of the spring wire are embodied as inclined in relation to each other before the helical compression spring 40 is wound. The side surfaces 42 are brought into parallel and the outer surface 44 of the spring wire is also flattened only as a result of the winding process and the attendant plastic deformations of the spring wire.

The foregoing relates to preferred exemplary embodiments of the invention, it being understood that other variants and embodiments thereof are possible within the spirit and scope of the invention, the latter being defined by the appended claims.

What is claimed is:

1. A helical compression spring (40) for use in a component (1) of a fuel injection system, said helical compression spring (40) comprising a wound spring wire, the helical compression spring (40) having a longitudinal axis (48) and acting with one end on a control part (20), which can be moved counter to force of the helical compression spring (40) by means of hydraulic pressure, the side surfaces (42) of the spring wire of the helical compression spring (40), which side surfaces (42) are oriented toward each other, being at least approximately parallel to each other for at least a part of their length, wherein the cross-sectional contour of the spring wire is flattened on the side (44), which constitutes the outside of the helical compression spring (40) and is rounded on the side (46), which constitutes the inside of the helical compression spring (40).

2. The helical compression spring according to claim 1 wherein the span of the cross sectional surface of the spring wire is greater in the radial direction with regard to the longitudinal axis (48) of the helical compression spring (40) than it is in the direction of the longitudinal axis (48) of the helical compression spring (40).

3. The helical compression spring (40) according to claim 2 wherein the helical compression spring (40) has a winding ratio ($w_s$) that is less than 5.

4. The helical compression spring (40) according to claim 2 wherein the winding height (H) of the helical compression spring (40) is at least approximately constant at least in the middle region of the helical compression spring (40).

5. The helical compression spring according to claim 1 wherein the cross sectional contour of the spring wire is flattened on the outer surface (44) that constitutes the outside of the helical compression spring (40) so that the outer surface (44) is embodied as at least approximately parallel to the longitudinal axis (48) of the helical compression spring (40).

6. The helical compression spring (40) according to claim 5 wherein the helical compression spring (40) has a winding ratio ($w_s$) that is less than 5.

7. The helical compression spring (40) according to claim 5 wherein the winding height (H) of the helical compression spring (40) is at least approximately constant at least in the middle region of the helical compression spring (40).

8. The helical compression spring according to claim 1 wherein the cross sectional contour of the spring wire corresponds at least approximately to a rectangle, whose corners are rounded and whose side, which constitutes the inner surface (46) of the helical compression spring (40), is embodied as convex.

9. The helical compression spring (40) according to claim 8 wherein the helical compression spring (40) has a winding ratio ($w_s$) that is less than 5.

10. The helical compression spring (40) according to claim 8 wherein the winding height (H) of the helical compression spring (40) is at least approximately constant at least in the middle region of the helical compression spring (40).

11. The helical compression spring (40) according to claim 1 wherein the area centroid (S) of the cross sectional area of the spring wire is a greater distance from the inner surface (46) of the spring wire than it is to the outer surface (44) of the spring wire.

12. The helical compression spring (40) according to claim 11 wherein the helical compression spring (40) has a winding ratio ($w_s$) that is less than 5.

13. The helical compression spring according to claim 12 wherein the control part is a tappet.

14. The helical compression spring (40) according to claim 1 wherein the helical compression spring (40) has a winding ratio ($w_s$) that is less than 5.

15. The helical compression spring (40) according to claim 1 wherein the winding height (H) of the helical compression spring (40) is at least approximately constant at least in the middle region of the helical compression spring (40).

16. The helical compression spring (40) according to claim 1 wherein the component is a fuel injection valve (1).

17. The helical compression spring according to claim 1 wherein the control part is a valve member (20).

18. The helical compression spring according to claim 1 wherein the component is a fuel pump.

19. A spring wire for producing a helical compression spring (40) for use in a component of a fuel injection system, where the helical compression spring (40) has a longitudinal axis (48) and acts with one end on a mobile control part (20), which can be moved counter to force of the helical compression spring (40) by means of hydraulic pressure, said spring wire having a cross sectional contour comprising a multitude of arc segments before the wire is wound to form the helical spring, the arc segments having at least two different radii, wherein the sides of the spring wire, which are oriented toward one another after the wire is wound to form the helical spring (40), are at least approximately parallel to one another for at least a part of their length.

20. The spring wire according to claim 19 wherein the cross sectional contour of the spring wire is flattened on the side, which constitutes the outside of the helical compression spring (40), after the wire is wound to form the helical spring.

* * * * *